United States Patent
Bouchez et al.

(10) Patent No.: US 7,000,398 B2
(45) Date of Patent: Feb. 21, 2006

(54) RAMJET ENGINE COMBUSTION CHAMBER AND RAMJET ENGINE EQUIPPED WITH SAME

(75) Inventors: Marc Bouchez, Bourges (FR); François Falempin, St Arnoult en Yvelines (FR)

(73) Assignees: EADS Space Transportation SA, Paris (FR); MBDA France, Paris (FR)

( * ) Notice: Subject to any disclaimer, the term of this patent is extended or adjusted under 35 U.S.C. 154(b) by 70 days.

(21) Appl. No.: 10/476,648

(22) PCT Filed: Feb. 27, 2003

(86) PCT No.: PCT/FR03/00629

§ 371 (c)(1),
(2), (4) Date: Nov. 4, 2003

(87) PCT Pub. No.: WO03/074858

PCT Pub. Date: Sep. 12, 2003

(65) Prior Publication Data

US 2004/0134195 A1    Jul. 15, 2004

(30) Foreign Application Priority Data

Mar. 4, 2002  (FR) .................. 02 02685

(51) Int. Cl.
F02K 7/10    (2006.01)
F02K 9/64    (2006.01)

(52) U.S. Cl. .......................... 60/767; 60/768

(58) Field of Classification Search .............. 60/767, 60/768, 769
See application file for complete search history.

(56) References Cited

U.S. PATENT DOCUMENTS

| | | | | |
|---|---|---|---|---|
| 3,279,194 A | | 10/1966 | Chapman | |
| 3,407,603 A | * | 10/1968 | Kelley et al. | 60/767 |
| 3,430,446 A | * | 3/1969 | McCloy | 60/768 |
| 4,170,110 A | | 10/1979 | Radin | |
| 4,840,025 A | * | 6/1989 | Coffinberry | 60/219 |
| 5,438,834 A | | 8/1995 | Vuillamy et al. | |
| 5,583,895 A | | 12/1996 | Filipuzzi et al. | |
| 5,899,060 A | | 5/1999 | Schmidt | |
| 6,182,442 B1 | | 2/2001 | Schmidt | |
| 6,482,485 B1 | | 11/2002 | Pichon | |

FOREIGN PATENT DOCUMENTS

| | | |
|---|---|---|
| EP | 0401107 | 12/1990 |
| EP | 0604279 | 6/1994 |
| EP | 1013412 | 6/2000 |
| FR | 2744174 | 8/1997 |
| FR | 2774432 | 8/1999 |
| FR | 2782378 | 2/2000 |
| WO | 9904156 | 1/1999 |

* cited by examiner

*Primary Examiner*—Ted Kim
(74) *Attorney, Agent, or Firm*—Stevens, Davis, Miller & Mosher, LLP

(57) ABSTRACT

The invention concerns a combustion chamber whereof the inner wall (17) is made at least partly of a thermostructural composite material, which is porous to the fuel passing through the double wall (14); and the porosity of said inner wall (17) is adjusted so that the proportion of said fuel passing through said inner skin ranges between 5% and 15% of the total amount of fuel input in said ramjet engine.

7 Claims, 5 Drawing Sheets

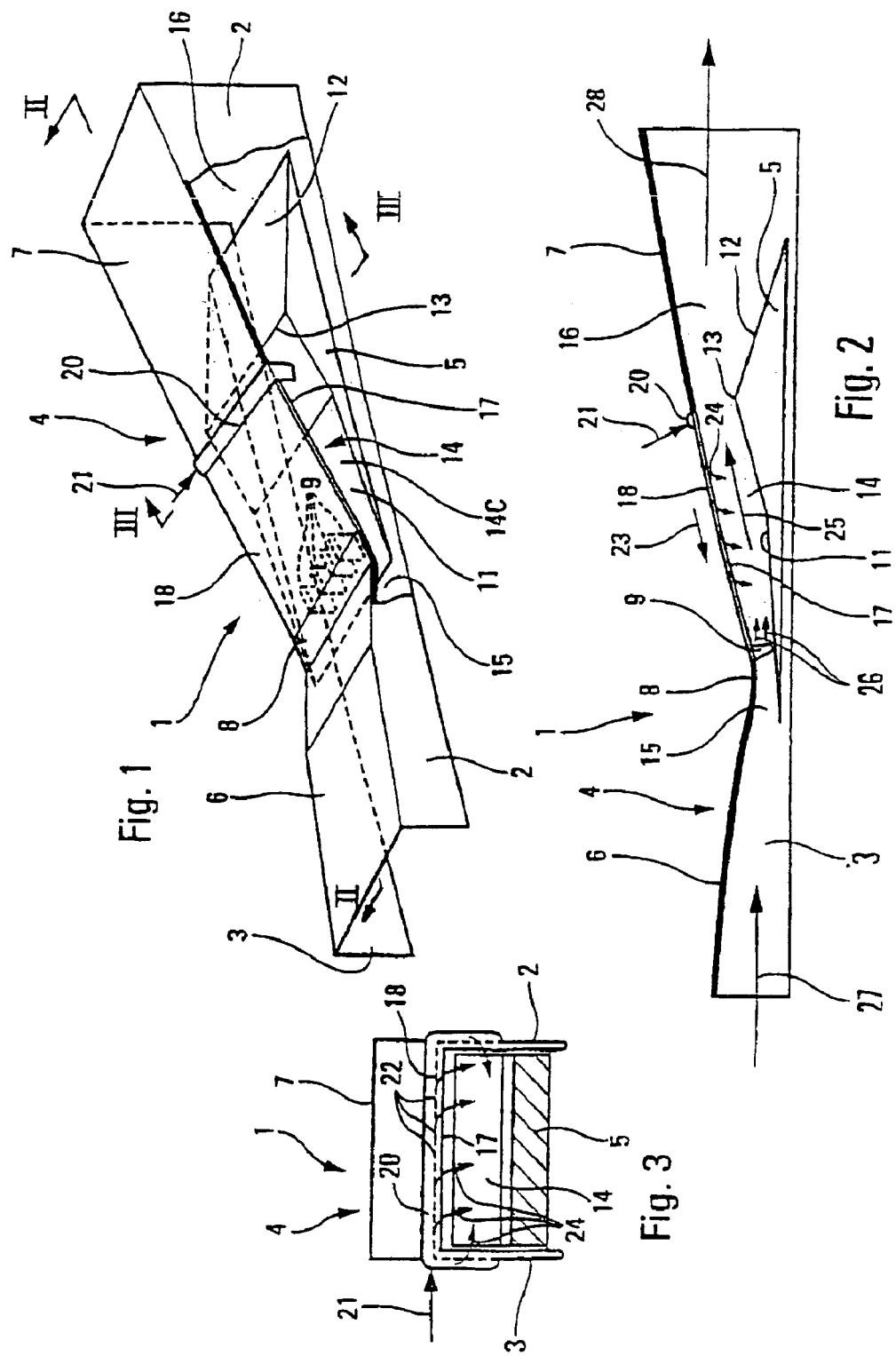

RAMJET ENGINE COMBUSTION CHAMBER AND RAMJET ENGINE EQUIPPED WITH SAME

The present invention relates to ramjets and, more especially, to ramjets known as hybrid ramjets, that is to say ones in which combustion switches from a subsonic rate to a supersonic rate in the same combustion chamber.

Such ramjets are used to propel aircraft, such as missiles, for example, and by way of fuel use a hydrocarbon up to a flight speed of about Mach 8, then use hydrogen for higher Mach numbers.

The combustion chambers of these hybrid ramjets are subjected to very severe operating conditions because they experience thermal flux that may be as much as 10 MW/m$^2$. Such thermal flux, in an enclosed section such as a combustion chamber, leads to very high temperatures (in excess of 2500° C.) that no material in current use is able to withstand, particularly under a few bar of pressure and in a stream of hot gases which are also oxidizing.

Furthermore, from the ramjet performance point of view, the more the Mach number increases, the more important it is to limit thermal losses at the wall. This is because these represent an increasingly large proportion of the energy released by the combustion and therefore considerably reduce the thrust.

All these reasons lead to the wall of hybrid ramjet combustion chambers being equipped with structures that are cooled by the circulation of a cooling fluid consisting of the fuel itself. The energy lost by the hot gases in the chamber near the walls is thus, to a large extent, recuperated by the cooling fuel. This fuel heats up, possibly decomposes, and the energy it has stored is restored to the propulsive flow when it is injected as hot fuel into said chamber. In the case of a hydrocarbon, the temperature and the nature of the compounds thus injected may also facilitate the ignition and the combustion process.

The solutions implemented in a known fashion (see, for example, documents FR-A-2 744 174, FR-A-2 782 378 and FR-A-2 774 432) for such regenerating cooling that recuperates heat energy consist in producing the cooled structures in the form of panels (usually made of metal) equipped with ducts through which the cooling fuel circulates.

Producing these panels entails:
machining ducts in said panels, and
brazing, welding, electrodeposition, plasma spraying, etc of a plate onto said panels to close the circuit.

In the case of a metal structure, the temperature of the hot wall must not exceed 1000° C. As a result, given the thermal flux involved, and the fuel flow rate dictated by the performance of the ramjet and the mission of the aircraft, it is necessary to have an effective and complex system:
small-sized ducts,
the smallest possible inter-duct space so as to limit thermal bridges and the risks of hot spots,
the addition of additional thermal barriers,
the improvement of the exchanges of heat in the ducts (roughnesses, carefully designed shape, obstacles, lattices made up of intermingled filaments, etc).

Given their higher maximum permissible temperatures (about 1800 K), the use of thermostructural composites of the C/SiC or C/C type makes it possible to reduce the thermal flux that has to be removed. These composites are therefore particularly advantageous to use in cases where the flow rate or refrigerating properties of the fuel are limited. This is because a hydrocarbon is barely able to remove more than 4 to 5 MJ/kg (provided it breaks down endothermically, otherwise it is limited to 1 MJ/kg), whereas hydrogen reaches a value of 15 MJ/kg.

The margins associated with the use of a thermostructural composite make it possible to have a structure with larger and possibly less numerous ducts. Such a technology can therefore be applied to the walls of the various constituent parts of a hybrid ramjet.

However, in all cases, the manufacture of the ducts in the composite poses many problems, such as:
the relative difficulty there is in machining silicon carbide;
the bonding or brazing of a second plate on the ducts, with temperatures that may exceed 1000° C. and internal pressures of 30 to 150 bar;
the installation between the meshes of the composite preform of pipes, for example made of tungsten, to form the ducts (cf. U.S. Pat. No. 5,583,895).

Furthermore, as hybrid ramjets do not generally have a shape that exhibits symmetry of revolution, but are, on the other hand, prismatic, and as they need to have a changing passage cross section, this results in additional difficulties associated with the use of ducts: in order to cool correctly the walls the width of which varies, a special arrangement needs to be determined, with a change in width, spacings, number of ducts. Such a system, combining variable-geometry ducts and inlets, is complicated to design and to manufacture.

Furthermore, the sealed assembly of panels to form the prismatic structure of these ramjets poses significant technical difficulties.

Finally, it will be pointed out that document U.S. Pat. No. 3,279,194 describes a jet propulsion engine in which fuel is used as a fluid for cooling double walls.

The object of the present invention is to overcome the disadvantages mentioned hereinabove and the invention relates to a ramjet with a simple structure, which can be made as a single piece, or in a limited number of pieces, without machining ducts for the circulation of cooling fluid.

To this end, according to the invention, the ramjet having an elongate body comprising:
at one of the ends of said body, an inlet for a stream of oxidizer;
at an intermediate part of said body, a combustion chamber which is provided with at least one fuel injector and in the heart of which the oxidizer and fuel are mixed and said mixture is burnt, the wall of said combustion chamber consisting at least in part of an inner skin arranged on the same side as said heart and an outer skin spaced away from said inner skin forming therewith an intermediate space and said fuel supplying said injector passing, at least in part, through said intermediate space to cool said wall; and
at the other end of said body, an exhaust jetpipe ducting the combustion gases leaving the heart of said combustion chamber, is notable in that:
said inner skin is made at least in part of a thermostructural composite, which is porous to said fuel passing through said intermediate space; and
the porosity of said inner skin is set so that the proportion of said fuel passing through said inner skin is between 5% and 15% of the total amount of fuel supplied for said ramjet.

Thus, in the ramjet of the present invention, the fuel used for cooling flows through said intermediate space, thus avoiding machining ducts in the corresponding wall or walls. In addition, some of said fuel used for the cooling passes through said porous inner skin and passes into the heart of the combustion chamber, where it participates in combustion, just like the fuel injected by the injectors. In addition, the fuel passing through the porous inner skin has the effect of keeping the combustion gases away from this inner skin and therefore of appreciably reducing the friction drag of said combustion gases against said inner skin. This results in a marked improvement in the ramjet performance. Thus, in the ramjet of the present invention, the fuel used for cooling not only recuperates heat energy from combustion, but also improves the performance of said ramjet.

It will be pointed out that, in the ramjet of the present invention, use is made of composites (with a carbon matrix or with a ceramic matrix) not only because of their mechanical properties and thermal resistance property, which are well known, but also for their intrinsic porosity, which is generally rather more considered to be a disadvantage, as described in document U.S. Pat. No. 5,583,895.

Thanks to the excellent mechanical and thermal-resistance properties of composites, the ramjet according to the present invention may have a very low mass with respect to known metal ramjets. Thanks to the porosity of these composites, a simple porous skin which nonetheless has good resistance to heat can be produced. In a known way, the porosity of said skin can be set to any desired value when the matrix of the composite of which it is made is densified. Of course, such setting of the porosity makes it possible to fix the proportion of cooling fuel passing through said porous inner skin to lower the frictional drag inside the heart of the combustion chamber.

As a preference, said outer skin is also made of a thermostructural composite. In this case, should it prove necessary to do so, said outer skin may be sealed against liquids and against gases, for example by applying an appropriate coating.

In a preferred embodiment, said inner and outer skins made of thermostructural composite are adjoined together by a plurality of threadlike spacers of thermostructural composite passing across said intermediate space, without obstructing it.

Although the ramjet and the combustion chamber both according to the present invention may have any desired shape, for example exhibit symmetry of revolution about a longitudinal axis, it is advantageous for:

the combustion chamber to consist of a single piece of prismatic overall shape in which the walls are all joined together and form a closed surface. For example, said combustion chamber has four walls in opposed pairs, giving it a closed rectangular cross section; or said combustion chamber to have a prismatic overall shape and to be made of two pieces, with at least one of said walls able to move with respect to the collection of the others which are joined together. For example, said combustion chamber has four walls in opposed pairs, three of said walls being joined together to form a trough with a U-shaped cross section, while the fourth wall is mounted so that it can move inside said trough.

Advantageously, said ends of said ramjet body, respectively forming the inlet for the stream of oxidizer and the jetpipe for exhausting the combustion gases, are made of thermostructural composite and are joined to said combustion chamber. Said ends of said ramjet body may even form just one piece of thermostructural composite, in which said combustion chamber according to the present invention is incorporated.

The figures of the attached drawing will make it easier to understand how the invention may be achieved. In these figures, identical references denote similar elements.

FIG. 1 shows, in schematic perspective view with partial cutaway, one exemplary embodiment of the ramjet according to the present invention.

FIG. 2 is a schematic view in longitudinal section on II—II of FIG. 1.

FIG. 3 is a schematic view in cross section on III—III of FIG. 1.

Figure 6:
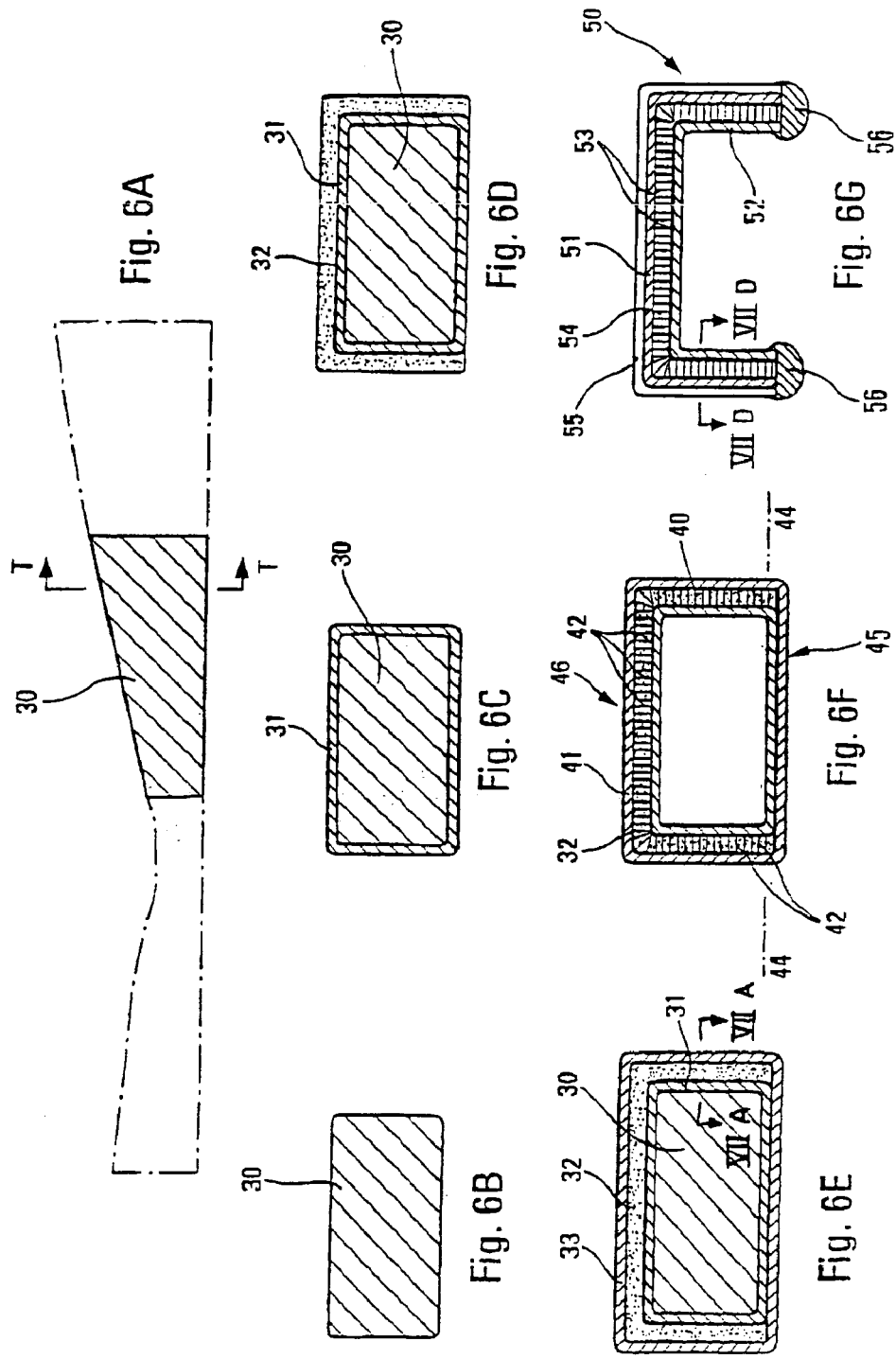
FIGS. 6A to 6G illustrate schematically, and not to scale, one embodiment of the combustion chamber of the ramjet of FIGS. 1 to 3, FIGS. 6B to 6G corresponding to the cross section line T—T of FIG. 6A.
Figure 7:
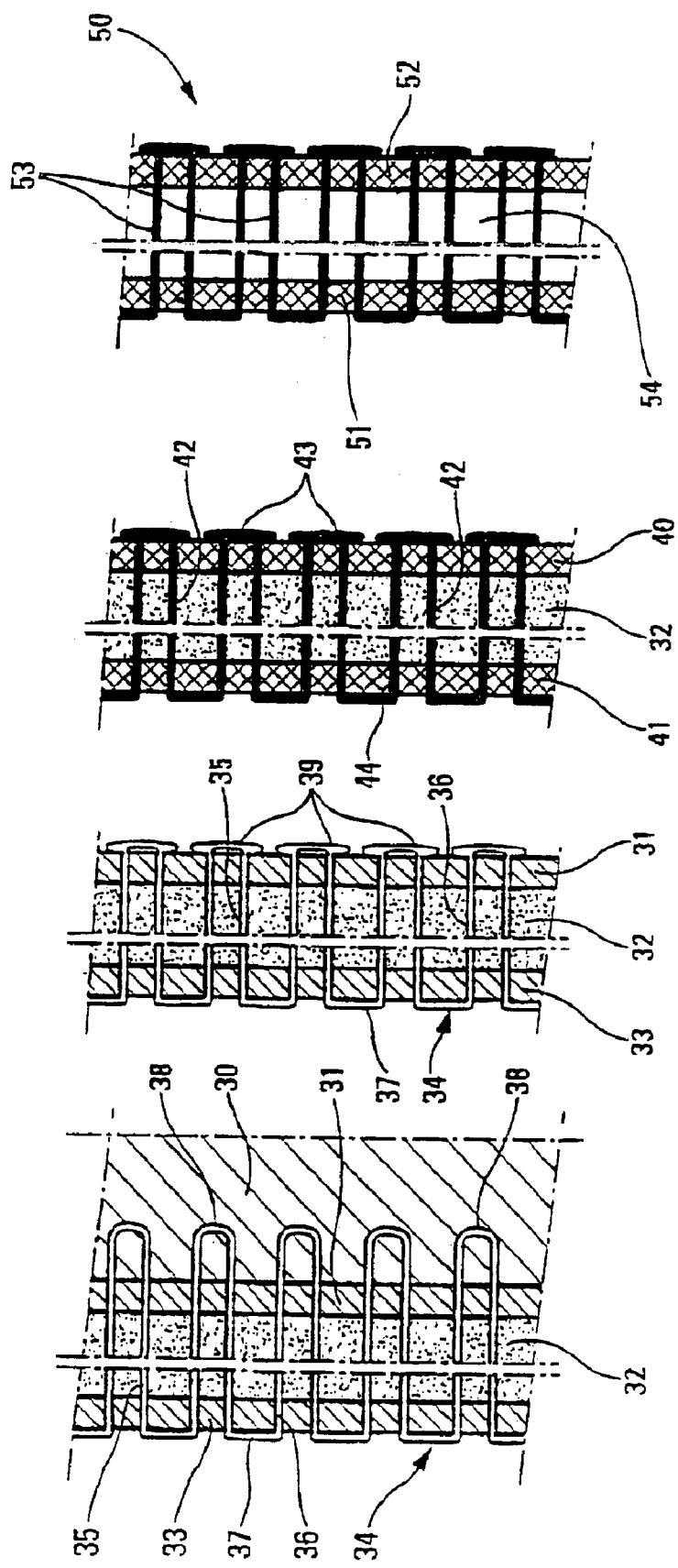

FIGS. 7A to 7D illustrate schematically, on a larger scale, the steps in the method for changing from the state of FIG. 6E to the state of FIG. 6G, FIG. 7A corresponding to the section line VIIA—VIIA of FIG. 6E and FIG. 7D to the section line VIID—VIID of FIG. 6G. In these FIGS. 7A to 7D, for clarity, the two filament portions of each "stitch" are depicted as being widely spaced apart, but it goes without saying that in actual fact they are close together.

Figure 8:
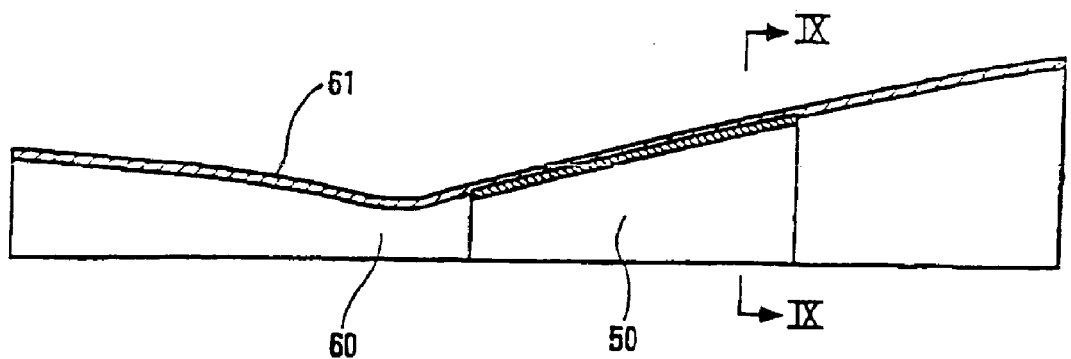
Figure 9:
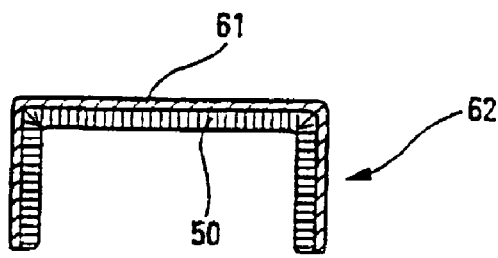

FIGS. 8 and 9 schematically illustrate, in longitudinal section and in cross section, respectively, one exemplary embodiment of the ramjet of FIGS. 1 to 3, once the combustion chamber according to the present invention has been produced.

Figure 10:
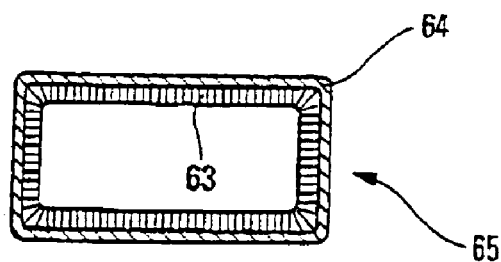

FIG. 10 schematically illustrates in cross section an alternative form of embodiment of the combustion chamber of the ramjet according to the present invention.

The variable-geometry ramjet of an aircraft according to the present invention and illustrated schematically in FIGS. 1 to 3 comprises an elongate ramjet body 1 consisting of four walls 2 to 5, in opposed pairs. The two opposed side walls 2 and 3 are flat and mutually parallel.

The top wall 4 is secured to the two side walls 2 and 3 and the collection of walls 2, 3 and 4 forms an inverted trough with a rectangular U-shaped cross section. The top wall 4 longitudinally has the overall shape of an open V with an obtuse angle. It comprises a front flank 6 and a rear flank 7, these being inclined one with respect to the other and connected by a corner 8 in the form of an angled face. As is illustrated in the figures, the front 6 and rear 7 flanks may each, in practice, have facets slightly inclined with respect to one another.

Fuel injectors 9 are arranged near the corner 8, suspended from the top wall 4.

The bottom wall 5, the length of which is shorter than the length of the top wall 4, also has the overall shape of an open V with an obtuse angle. It is housed in the trough formed by the walls 2, 3 and 4 and inverted with respect to the top wall 4. It comprises a front flank 11 and a rear flank 12 which are inclined with respect to each other and connected by a corner 13.

Thus, in the ramjet of FIGS. 1 to 3, between the side walls 2 and 3:

the combustion chamber 14 is formed, at an intermediate part of the body 1 between, on the one hand, the rear flank 7 of the top wall 4 and, on the other hand, the part of the front flank 11 of the bottom wall 5 facing said rear flank 7;

the oxidizer (air) inlet 15 is formed, at one of the ends of the body 1, between the front flank 6 of the top wall 4 and the part of the front flank 11 of the bottom wall 5 facing said front flank 6; and the exhaust jetpipe 16 is formed, at the other end of the body 1, between the rear flank 7 of the top wall 4 and the rear flank 12 of the bottom wall 5.

Furthermore, the bottom wall 5 of the ramjet 1 is mounted so that it can move, in a way not depicted, between said side walls 2 and 3 so as to allow the geometry of the combustion chamber 14 to be varied progressively from the oxidizer inlet 15 and the jetpipe 16, so as to tailor the ramjet to the flight conditions of the aircraft on which it is mounted and thus obtain optimum performance of the latter in terms either of thrust or of specific impulse.

Figure 4:
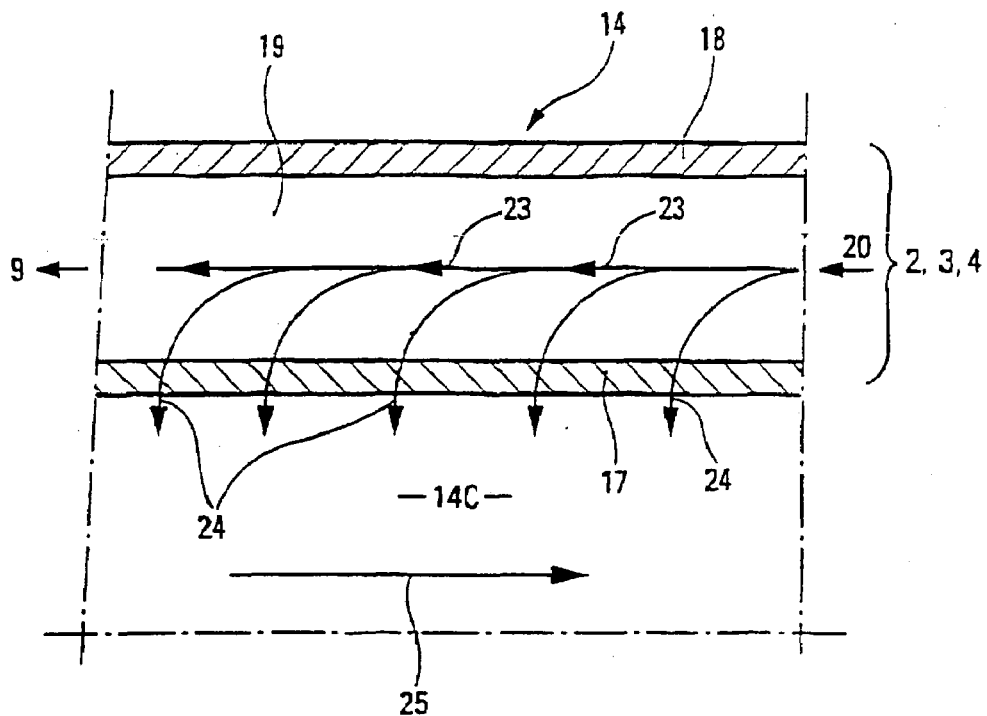
FIG. 4 is a schematic sectioned part view, on an enlarged scale, of the wall of the combustion chamber of the ramjet of FIGS. 1 to 3, illustrating the supply of fuel to the latter.

As shown in FIGS. 1 to 3 and illustrated on a larger scale in FIG. 4, the part of the top wall 4 and/or the parts of the side walls 2 and 3 facing the combustion chamber 14 consist of an inner skin 17 made of thermostructural composite delimiting the heart 14C of the combustion chamber 14 and of an outer skin 18, also made of thermostructural composite, spaced away from said inner skin 17, leaving therewith an intermediate space 19. The outer skin 18 is sealed against gases, while the inner skin 17 has intrinsic porosity.

A manifold 20, mounted on the walls 2, 3 and 4, is supplied with fuel, and symbolized by the arrow 21. Thanks to orifices 22 made in said walls, the manifold 20 may, in turn, introduce said fuel into said intermediate space 19, so as to feed the injectors 9, connected thereto. Thus, said injectors 9 are supplied with fuel through the intermediate space 19, as illustrated by the arrows 23. The fuel passing across the intermediate space 19 toward the injectors 9 cools said walls 2, 3, 4. It may constitute all or just part of the fuel sent to said injectors.

Because said inner skin 17 is porous, some of the fuel passing across the intermediate space 19 toward the injectors 9 (arrows 23) passes through said inner skin 17 to enter the heart 14C of the combustion chamber 14, as illustrated by the arrows 24. The fuel passing through the inner skin 17 keeps the gases (arrow 25) resulting from the combustion of the fuel injected by the injectors 9 (arrow 26) in the presence of the stream of oxidizer (27) and ejected through the jetpipe 16 (arrow 28) away from this inner skin 17.

Figure 5:
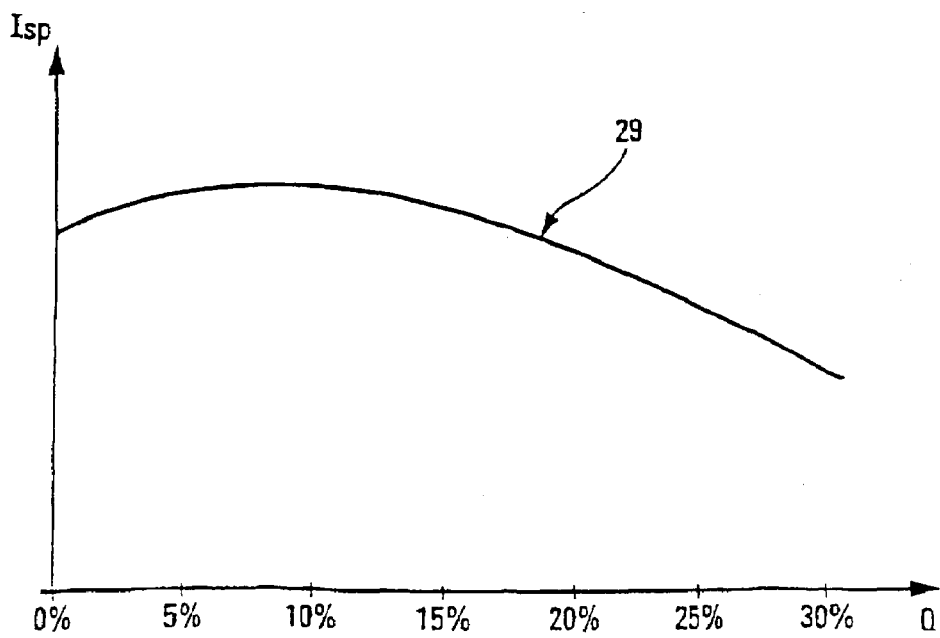
FIG. 5 is a diagram illustrating the variation in specific impulse as a function of the amount of fuel passing through the inner skin of the combustion chamber.

FIG. 5 gives the curve 29 illustrating the variation in specific impulse Isp (in m/s) of the ramjet 1, for a particular configuration, as a function of the proportion of the fuel flow rate passing through the porous inner skin 17 (arrows 24) with respect to the total fuel flow rate Q supplied to said ramjet. Here it can be seen that it is advantageous for this proportion to be higher than 5% but lower than 15%, for example for it to be of the order of 10%.

FIGS. 6A to 6G and 7A to 7D schematically illustrate one embodiment of the ramjet according to the present invention.

To produce it, the starting point is to produce, for example out of a synthetic foam material through which a needle can pass, a former 30 (see FIG. 6A) exhibiting the interior shape of the combustion chamber 14, that it to say its heart 14C. Then, any known method (winding, weaving, etc) is used to apply to this former 30 a structure 31 of high-strength fibers, such as fibers based on carbon, on silicon or on silicon carbide, which structure is intended to form a fiberous framework for said inner skin 17 (see FIG. 6C). Next, a core 32, for example made of a polystyrene foam not impregnable by the resins intended to form the composite matrices and representative of the intermediate space 19, is applied to the three sides of the fiberous structure 31 corresponding to the walls 2, 3 and 4 (see FIG. 6D). The material of which the core 32 is formed can be pierced by a needle and removed thermally.

A structure 33 of high-strength fibers (C, SiC, etc) is applied to the core 32, this structure being intended to constitute a fiberous framework for the outer skin 18 (see FIG. 6E).

As shown on a larger scale in FIG. 7A, the fiberous structure 31, the annular core 32 and the fiberous structure 33 are joined together by stitching without knotting of a continuous filament 34, itself consisting of a plurality of high-strength fibers (C, SiC, etc). The continuous filament 34 forms portions 35, 36 passing through the elements 31, 32, 33 and connected alternately to one another by bridges 37 applied to the fiberous structure 33 and loops 38 penetrating the former 30.

After this stitching operation, the former 30 is removed and the loops 38 are knocked over and pressed against the fiberous structure 31 to form masses 39 (see FIG. 7B), then the collection of fiberous structures 31 and 33 is impregnated with a resin that is curable, relatively low in viscosity and possibly diluted, for example with alcohol. Impregnation is preferably performed under a vacuum, so that said resin not only penetrates the fiberous structures 31 and 33 but also runs along and into the portions of penetrating filament 35, 36. During this impregnation, the core 32 is not impregnated with the resin because it is impermeable thereto.

The impregnated resin is then cured, for example by raising its temperature, for long enough for the fiberous structures 31 and 32 to become rigid skins 40 and 41 respectively, and for the portions of penetrating filament 35 and 36 to become rigid threadlike spacers 42 (see FIG. 7C). These spacers 42 are firmly anchored at their ends in the rigid skins 40 and 41 by rigid anchors 43 and 44 formed, respectively, from the masses 39 and from the bridges 37. At this stage in the manufacturing process, it is possible, for example by sawing along the line 44, to remove the part 45 with no core 32, so as to keep only the trough-shaped part 46.

To form the matrix of all the rigid skins 40 and 41 and spacers 42, said trough 46 is subjected to pyrolysis at high temperature, for example of the order of 900° C., something which stabilizes the geometry of said assembly and eliminates the core 32. This assembly may possibly be densified and treated in a known way so that its matrix turns into one of the ceramic type.

This then yields the monolithic piece 50 (see FIGS. 6G and 7D) intended at least in part to form the combustion chamber 14 and comprising:

an outer skin 51 of composite, originating from the skin 41 and intended at least in part to form the outer wall 18 of the combustion chamber 14;

an inner skin 52 of composite, originating from the skin 40 and intended to form the inner wall 17 of the combustion chamber 14; and a plurality of threadlike spacers 53 of composite, originating from the spacers 42.

In this monolithic piece 50, the skins 51 and 52 are spaced apart delimiting an intermediate space 54 crossed by the spacers 53 without being plugged and intended to form the intermediate space 19 of the combustion chamber 14.

It is known that, through its nature, a composite is porous and that this porosity depends on the conditions under which the matrix is formed. It can therefore be readily appreciated that the porosity of the inner skin 52 can be tailored to impart thereto the required porosity for the inner wall 17. In so doing, the outer skin 51 is given a porosity identical to that desired for the inner skin 52. Now, since the outer wall 18 needs to be impervious, it may be advantageous for the outer skin 51 to be externally coated with a sealing coating 55, as is depicted in FIG. 6G.

In addition, as need be, a run of composite 56 is laid along the edges of the piece 50 corresponding to the sawing line 44, to seal the intermediate space 54.

To obtain the ramjet body 1 (except for the wall 5 which may be manufactured independently) it is possible (see FIGS. 8 and 9) to place the piece 50 on a former 60 having the interior shape of the collection of walls 2, 3 and 4 and to deposit on said former 60 and on said piece 50 (by winding, weaving, etc) a fiberous structure which, after impregnation, polymerization, pyrolysis, densification, etc, becomes a trough-shaped shell 61 enshrining the piece 50. Thus, these two pieces 50 and 60 of thermostructural composite form a piece 62 representative of the entirety of the elongate body 1, except for the wall 5.

Although, in the example described hereinabove, it has been assumed that, in the ramjet body 1, the wall 5 was independent of the trough formed by the walls 2, 3, 4, it goes without saying that a ramjet in which the wall 5 was secured to the walls 2, 3 and 4 may be produced according to the present invention. In this case (see FIG. 10) the thermostructural composite piece 63 representative of the combustion chamber 14 and corresponding to the above piece 50 could be closed prismatic and would be enshrined in a closed thermostructural composite envelope 64, of closed prismatic shape (corresponding to the shell 61), to form a thermostructural composite piece 65 one of the walls of which would be representative of said wall 5.

The invention claimed is:

1. A ramjet having an elongate body, the ramjet comprising:

at one end of said body, an inlet for a stream of oxidizer;

at an intermediate part of said body, a combustion chamber which is provided with at least one fuel injector and in the heart of which the oxidizer and fuel mix and said mixture is burnt, the wall of said combustion chamber consisting at least in part of an inner skin arranged on the same side as said heart and an outer skin spaced away from said inner skin forming therewith an intermediate space and said fuel supplying said injector passing, at least in part, through said intermediate space to cool said wall; and at the other end of said body, an exhaust jetpipe ducting the combustion gases leaving the heart of said combustion chamber, wherein:

said inner skin is made at least in part of a thermostructural composite, which is porous to said fuel passing through said intermediate space;

the porosity of said inner skin is set so that the proportion of said fuel passing through said inner skin is between 5% and 15% of the total amount of fuel supplied for said ramjet;

said outer skin is made of a thermostructural composite that is sealed against liquids and gases; and said inner and outer skins made of thermostructural composite are adjoined together by a plurality of threadlike spacers of thermostructural composite passing across said intermediate space.

2. The ramjet as claimed in claim 1, wherein said combustion chamber consists of a single piece in which the walls are all joined together and form a closed prismatic surface.

3. The ramjet as claimed in claim 1, wherein said combustion chamber has four walls in opposed pairs, giving it a closed rectangular cross section.

4. The ramjet as claimed in claim 1, wherein said combustion chamber is made of two pieces, with at least one of the walls of said combustion chamber able to move with respect to the collection of the others which are joined together.

5. The ramjet as claimed in claim 4, wherein said combustion chamber has four walls in opposed pairs, three of said walls being joined together to form a trough with a U-shaped cross section, while the fourth wall is mounted so that it can move inside said trough.

6. The ramjet as claimed in claim 1, wherein said ends of said ramjet body, respectively forming the inlet for the stream of oxidizer and the jetpipe for exhausting the combustion gases, are made of thermostructural composite and are joined to said combustion chamber.

7. The ramjet as claimed in claim 6, wherein said ends of said ramjet body form just one piece of thermostructural composite, in which said combustion chamber is incorporated.

* * * * *